US006542168B2

(12) United States Patent
Negishi et al.

(10) Patent No.: US 6,542,168 B2
(45) Date of Patent: *Apr. 1, 2003

(54) THREE-DIMENSIONAL WINDOW DISPLAYING APPARATUS AND METHOD THEREOF

(75) Inventors: Hisashi Negishi, Inagi (JP); Yasuhiko Tsuchi, Inagi (JP); Yoshihiro Nakagaki, Inagi (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,159

(22) Filed: Jul. 29, 1997

(65) Prior Publication Data

US 2002/0080182 A1 Jun. 27, 2002

(30) Foreign Application Priority Data

Feb. 4, 1997 (JP) .............................................. 9-021452
Jun. 3, 1997 (JP) .............................................. 9-144818

(51) Int. Cl.$^7$ ................................................ G06F 3/14
(52) U.S. Cl. ...................... 345/781; 345/848; 345/764; 345/788; 345/732
(58) Field of Search ................................ 345/340, 355, 345/339, 342, 427, 419, 976, 781, 848, 764, 788, 732

(56) References Cited

U.S. PATENT DOCUMENTS

| 5,012,433 A | * | 4/1991 | Callahan et al. ............. 345/434 |
| 5,249,296 A | * | 9/1993 | Tanaka ......................... 345/340 |
| 5,621,906 A | * | 4/1997 | O'Neill et al. .............. 345/355 |
| 5,745,109 A | * | 4/1998 | Nakano et al. ............. 345/355 |
| 5,754,809 A | * | 5/1998 | Gandre ........................ 345/355 |
| 5,767,855 A | * | 6/1998 | Bardon et al. .............. 345/419 |
| 5,841,440 A | * | 11/1998 | Guha ........................... 345/419 |

FOREIGN PATENT DOCUMENTS

| EP | 0 349 459 | 1/1990 |
| EP | 0 583 206 | 2/1994 |
| JP | 6-186948 | 7/1994 |
| JP | 6-266330 | 9/1994 |
| JP | 9-146753 | 6/1997 |

OTHER PUBLICATIONS

Anon, "Quick Selection of Window Environment Coordinates", IBM Technical Disclosure Bulletin, vol. 35, No. 4b, Sep. 1992, pp. 57–60.
European Search Report, EP98 30 0128, Jul. 15, 1999.

* cited by examiner

Primary Examiner—Kristine Kincaid
Assistant Examiner—Thomas T. Nguyen
(74) Attorney, Agent, or Firm—Staas & Halsey LLP

(57) ABSTRACT

In the window system, patterns of windows, icons, buttons, and so forth are defined in a body coordinate system. The window system has definition data for a process corresponding to a button and so forth. The definition data has a displaying portion including a display command for displaying a window and so forth. The displaying portion causes a window and so forth to be displayed on a display unit corresponding to designated coordinate values. The displaying portion has a three-dimensional displaying portion that rearranges each object from the body coordinate system to the world coordinate system corresponding to designated coordinate values and projects the resultant object on a screen at a designated view point. The three-dimensional displaying portion supplies coordinate values for three-dimensionally displaying the object to the displaying portion.

15 Claims, 12 Drawing Sheets

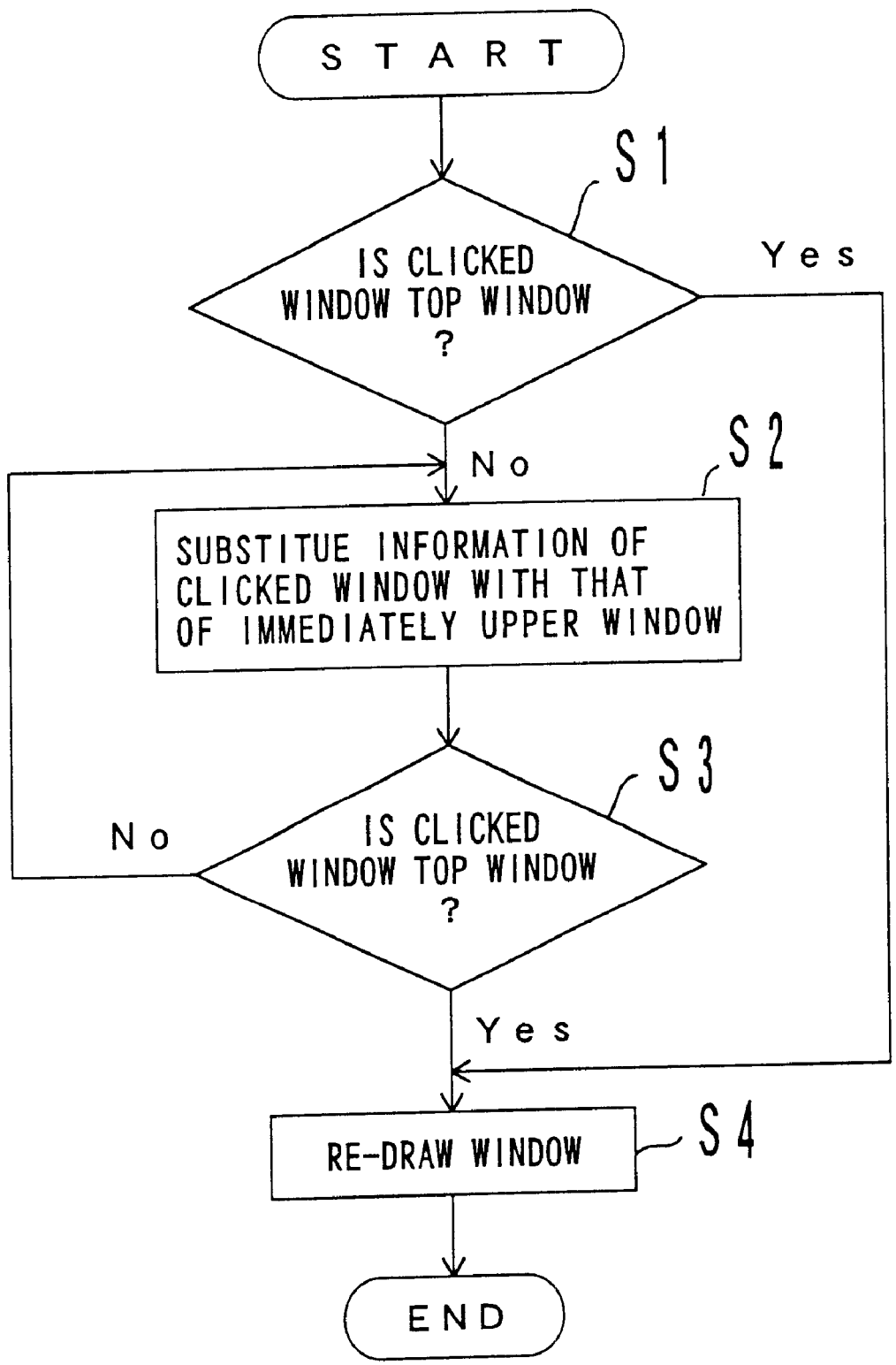
F I G. 6

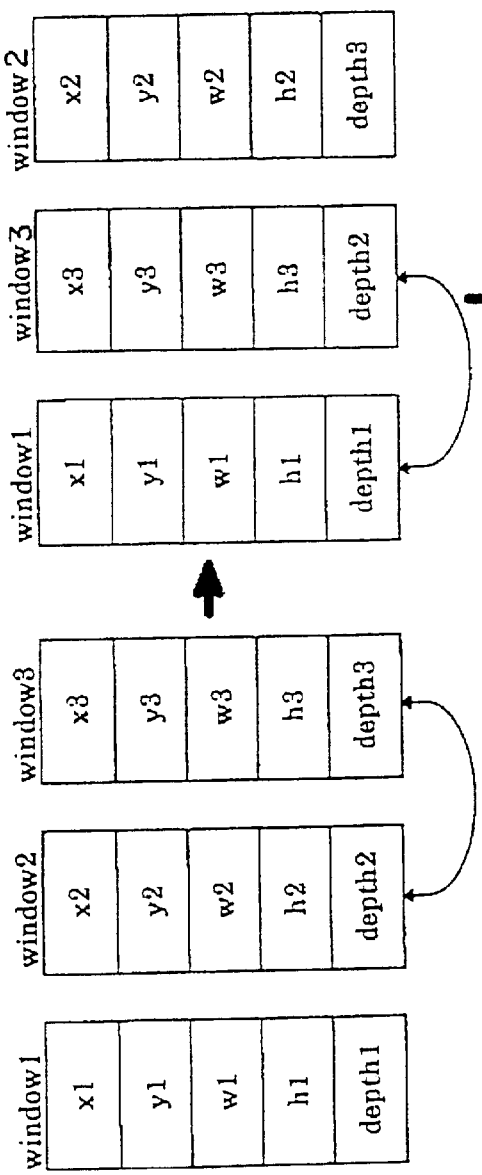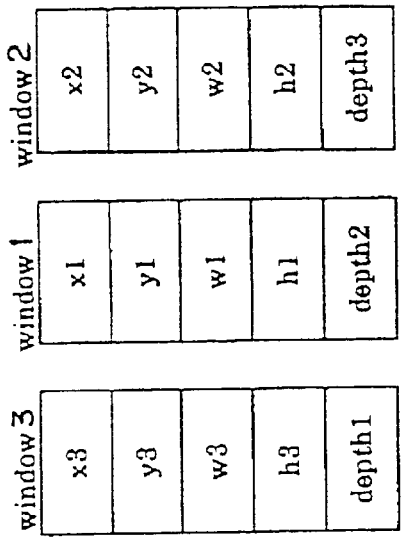
FIG. 7A
FIG. 7B
FIG. 7C

| X COORDINATE AT UPPER LEFT CORNER |
| Y COORDINATE AT UPPER LEFT CORNER |
| WIDTH W |
| HEIGHT H |
| ⋮ |
| DEPTH |

THREE-DIMENSIONAL WINDOW DISPLAYING APPARATUS AND METHOD THEREOF

BACKGROUND OF THE INVENTION

1. Field of the Invention

The present invention relates to a system for three-dimensionally displaying windows of a window system.

2. Description of the Related Art

As process performance of information processing units has been improved, various window systems have been used. In particular, as the process performance of personal computers has been improved, graphics-based operating environments have been provided as window systems for personal computers used by end users. Thus, a user-friendly interface is provided for novice users who are not familiar with operating systems.

FIGS. 1A and 1B are schematic diagrams showing examples of windows displayed on screens. In a conventional window system, windows are two-dimensionally displayed on a screen 110 of a display unit. In FIG. 1A, windows 111, 112, and 113 are opened on the screen 110. However, the windows 111, 112, and 113 overlap with each other. The window 111 that the user is currently using is displayed as the top window on the screen 110. The other windows 112 and 113 are placed behind the window 111. When the user wants to use the window 112 or 113, he or she should click it or perform a predetermined operation so as to cause the window 112 or 113 to be displayed as the top window on the screen 110.

When the user wants to move an icon or the like from window 111 to another window, he or she should move the window 112 or 113 so that it does not overlap with window 111. Thereafter, the user causes the icon or the like to be displayed and moves it between the windows.

Thus, when windows are two-dimensionally displayed on the screen 110, they tend to overlap with each other. To display a window hidden behind another window, the hidden window should be moved. In particular, when the top window 111 is displayed in a large size, even if the windows 112 and 113 are moved, it is impossible to display all the icons in the windows 112 and 113 at the same time. Thus, in a window operating system with a multi-task environment, unnecessary windows that are not currently being used should be reduced to an icon so that the necessary window can be displayed in the full screen size. Thus, windows should be operated one after the other.

On the other hand, a system that displays unnecessary windows as inclined windows has been proposed. This system suppresses windows from overlapping with each other so that many windows are displayed at the same time. FIG. 1B shows an example of a display screen of such a system.

Referring to FIG. 1B, three windows 114, 115, and 116 are displayed on the screen 110. The window 114 is displayed on the screen 110 in the same manner as the window 111 shown in FIG. 1A. However, the windows 115 and 116 are inclined so that they do not overlap with each other. Thus, these windows 115 and 116 are displayed as if they were placed in a three-dimensional space. In addition, the overlapped portion of the windows can be minimized. Thus, icons and so forth displayed on individual windows can be operated at the same time.

As well as window definition data with which the window 114 is displayed, this system has window definition data with which the inclined windows 115 and 116 are displayed. When necessary, the window definition data with which the inclined windows are displayed is used.

This system has been disclosed as Japanese Patent Laid-Open Publication No. 6-186948.

In the window system as shown in FIG. 1A, when many windows overlap with each other or a large window is displayed above another window, it is difficult to select a file in the hidden window. In addition, it is difficult to observe the content of the hidden window.

On the other hand, in the window system shown in FIG. 1B, although windows are apparently displayed three-dimensionally, they are only inclined windows. Thus, when inclined windows overlap with each other, there are the same drawbacks as those with the system shown in FIG. 1A.

SUMMARY OF THE INVENTION

An object of the present invention is to provide a three-dimensional window displaying system that allows the user to observe an overlapped portion of windows from a different view point.

A first aspect of the present invention is a window displaying apparatus for displaying a window on a display means, comprising a window placing means for placing the window displayed on the display means in a virtual space, and an image generating means for generating an image of the window viewed from a view point freely designated, wherein the image generated by the image generating means is displayed on the display means.

A second aspect of the present invention is a window displaying apparatus for displaying a window on a display means, comprising a virtual distance defining means for defining a virtual distance to the window displayed on the display means, and an image generating means for generating an image of the window whose virtual distance has been defined by the virtual distance defining means, the image being viewed from a view point freely designated, wherein the image generated by the image generating means is displayed on the display means.

According to the apparatus of the present invention, a plurality of windows with an operation button can be displayed. When an overlapped portion of the windows hides a portion of a particular window, the user can observe the window from a different view point and operate an operation button in the window.

A third aspect of the present invention is a window displaying method for displaying a window on a display means, comprising the steps of placing the window displayed on the display means in a virtual space, generating an image of the window placed at the window placing step, the image being viewed from a view point freely designated, and displaying the image generated at the image generating step on the display means.

A fourth aspect of the present invention is a window displaying method for displaying a window on a display means, comprising the steps of defining a virtual distance to the window displayed on the display means, and generating an image of the window whose virtual distance has been defined at the virtual distance defining step, the image being viewed from a view point freely designated.

A fifth aspect of the present invention is a method for displaying a window on a display means and displaying an operation button on the window, comprising the steps of defining a virtual distance to the window displayed on the display means, and generating an image of the window whose virtual distance has been defined at the virtual distance defining step, and an image of the operation button.

According to the method of the present invention, a plurality of windows with an operation button can be displayed. When an overlapped portion of the windows hides a portion of a particular window, the user can observe the window from a different view point and operate an operation button on the window.

A sixth aspect of the present invention is a storage medium from which a computer that displays a window on a display means reads data that causes the computer to perform the functions of placing the window displayed on the display means in a virtual space, generating an image of the window placed by the window placing function, the image being viewed from a view point freely designated, and displaying the image generated by the image generating function on the display means.

A seventh aspect of the present invention is a storage medium from which a computer that displays a window on a display means reads data that causes the computer to perform the functions of defining a virtual distance to the window displayed on the display means, and generating an image of the window whose virtual distance has been defined by the virtual distance defining function, the image being viewed from a view point freely designated.

An eighth aspect of the present invention is a storage medium from which a computer that displays a window on a display means and displays an operation button on the window reads data that causes the computer to perform the functions of defining a virtual distance to the window displayed on the display means, and generating an image of the window whose virtual distance has been defined by the virtual distance defining function, and an image of the operation button.

According to the computer that reads data causing the computer to perform such functions, a plurality of windows with an operation button can be displayed. When an overlapped portion of the windows hides a portion of a particular window, the user can observe the window from a different view point and operate an operation button on the window.

According to the present invention, windows and other objects that are conventionally defined on a plane are arranged in a virtual three-dimensional space and projected on a plane. Thus, windows can be three-dimensionally displayed.

In particular, when the position of a view point from which windows and other objects are projected in a virtual three-dimensional space is determined, the windows and the other objects can be displayed as if the user observes them from a different view angle. Thus, the user can observe a particular window hidden behind other windows by changing his or her view point. Although the windows and other objects are three-dimensionally displayed, methods for processes corresponding to operations are not changed. Thus, operations that are performed in the conventional window system can be performed on three-dimensional windows.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 6 is a flowchart showing a process for placing a clicked window as the top window;

FIGS. 7A to 7C are schematic diagrams showing data changed corresponding to the process shown in FIG. 6;

DESCRIPTION OF PREFERRED EMBODIMENTS

Figure 1A:
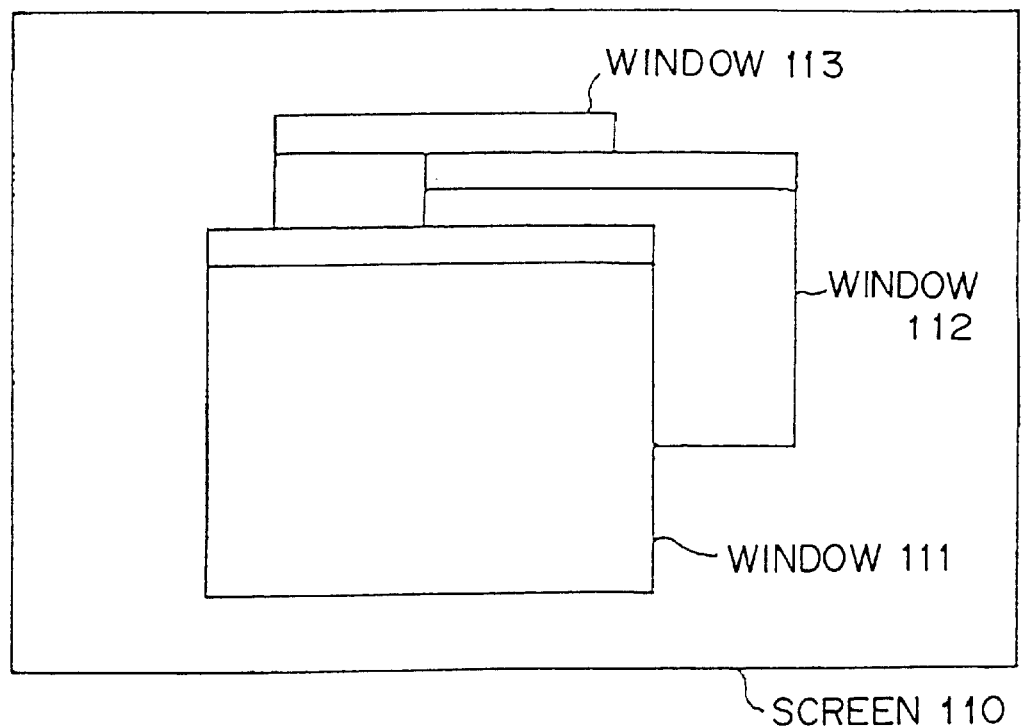
FIGS. 1A and 1B are schematic diagrams showing examples of windows displayed on screens of conventional window systems.
Figure 1B:
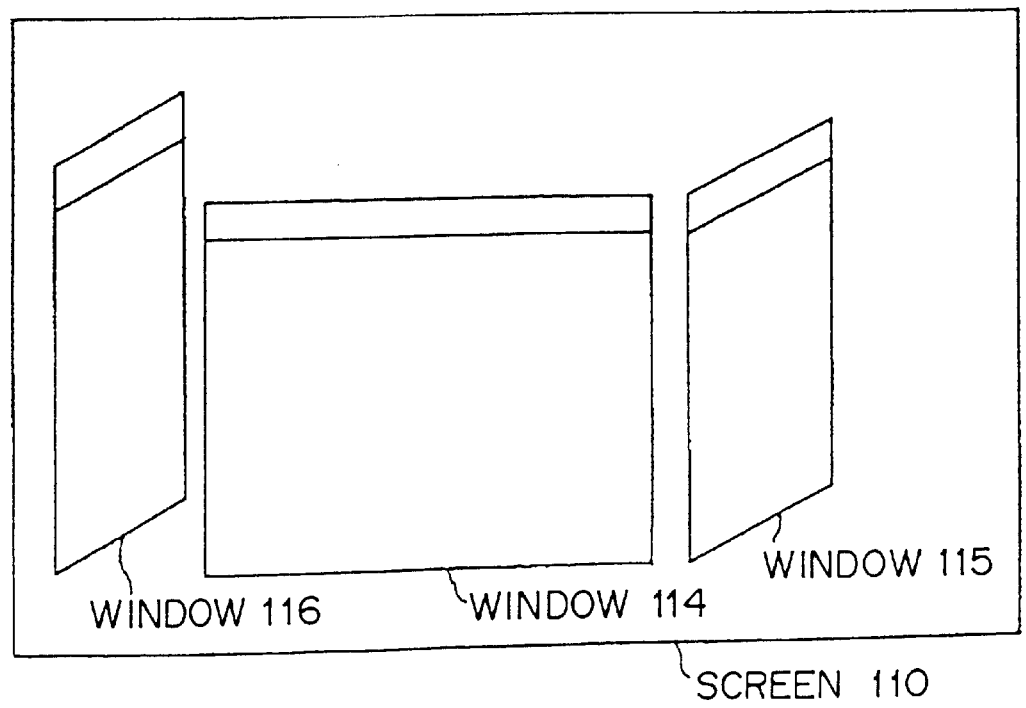
Figure 2:
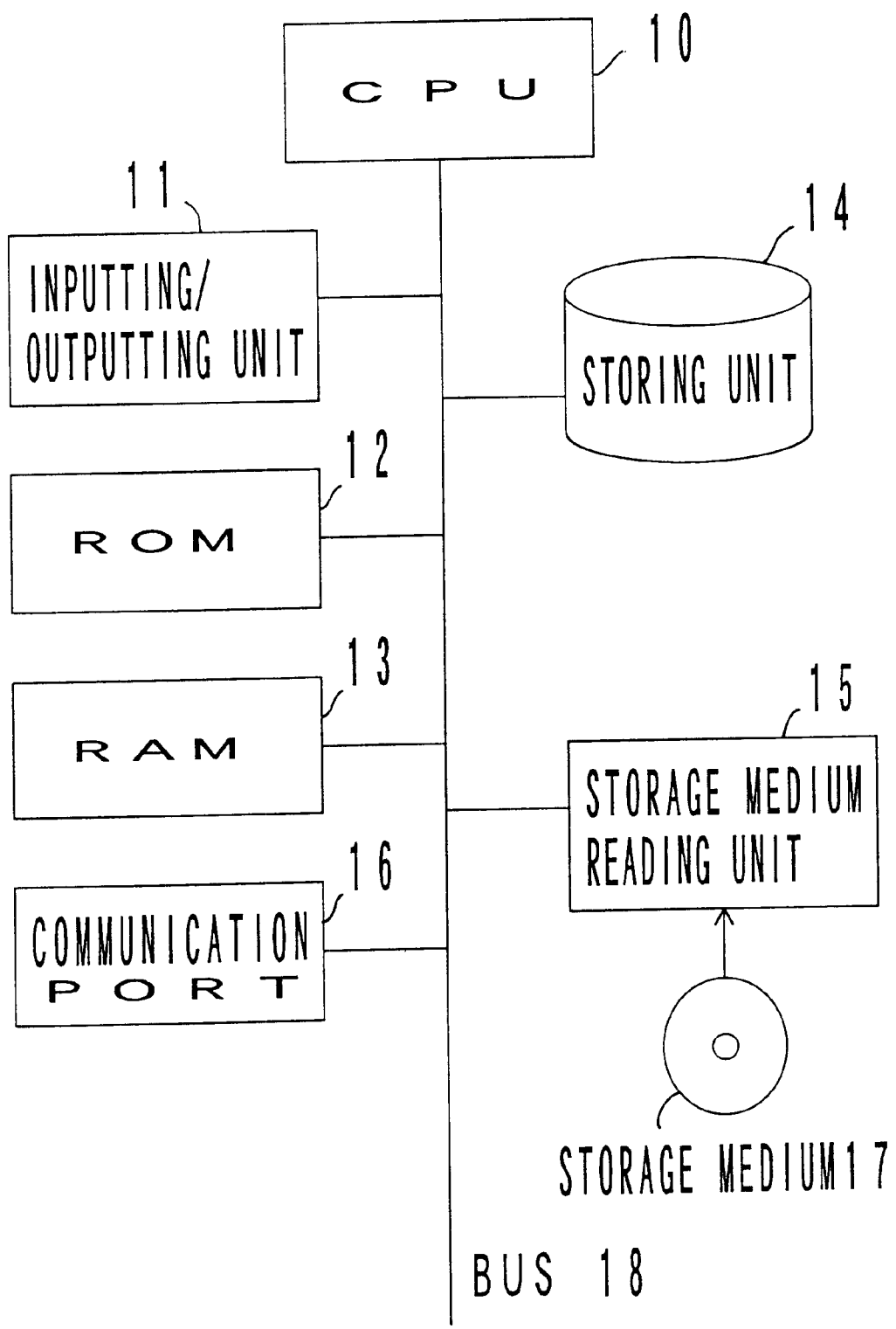
FIG. 2 is a schematic diagram showing the structure of hardware of a system according to the present invention.

FIG. 2 is a schematic diagram showing the structure of hardware of a system according to the present invention. It should be noted that as long as the system is an information terminal unit (for example, a personal computer) that has hardware to which a window system can be installed, the system according to the present invention is not limited to the structure shown in FIG. 2.

As the structure of the hardware, the system has a CPU 10 that performs various calculations. A bus 18 is connected to the CPU 10. In addition, an inputting/outputting unit 11, a ROM 12, a RAM 13, a storing unit 14, a communication port 16, and a storage medium reading unit 15 are connected to the bus 18.

The inputting/outputting unit 11 is composed of, for example, a keyboard and a display unit. In particular, to use the window system, the inputting/outputting unit 11 normally includes a mouse.

The ROM 12 stores a basic input/output system such as BIOS. When operation of the system shown in FIG. 2 is started, the CPU 10 reads the BIOS from the ROM 12 and executes it. Thus, the CPU 10 can input/output information from/to the inputting/outputting unit 11. The BIOS causes commands to be sent to the CPU 10 and calculated results from the CPU 10 to be exchanged with the inputting/outputting unit 11 as a user interface. If the BIOS is destroyed, the user cannot normally use the apparatus. To prevent the BIOS from being destroyed and over-written, it is stored in the ROM 12.

Various application programs such as the window system are read to the RAM 13. When the CPU 10 executes the application programs, the user can use them. When the application programs are not used, they are stored in the storing unit 14 or the storage medium 17. When necessary, the application programs are read to the RAM 13 and executed by the CPU 10.

The storing unit 14 is composed of, for example, a hard disk drive and a hard disk. The storing unit 14 is normally disposed in the apparatus. The storing unit 14 stores the operating system and various application programs. As described above, when the operating system and various application programs are executed, they are read to the RAM 13 and executed by the CPU 10.

The storage medium reading unit 15 is a unit that reads data from the storage medium 17 that is removable and portable. The storage medium reading unit 15 is, for example, a floppy disk drive or a CD-ROM drive. The storage medium 17 is, for example, a floppy disk or a CD-ROM. As with the storing unit 14, the storage medium 17 stores an operating system and various application programs. However, unlike with the storing unit 14, the storage medium 17 can be removed from the storage medium reading unit 15 and is portable. An operating system and an application program can be transferred (sold) with a storage medium 17. Thus, the system according to the present invention can be stored on a storage medium 17 and supplied to a third party.

The communication port 16 connects various peripheral units so as to expand the functions of the apparatus. For example, a printer, a scanner, and/or a similar unit can be connected to the communication port 16. A document created by an application program can be printed by the printer. The scanner converts an image and/or a text read from a printed item into digital data as an electronic document. The digital document can be edited by a word-processing program. A modem can be connected to the communication port 16 so that the user can use a network such as the Internet. In this case, various application programs can be downloaded from a network such as the Internet. The application programs can be stored in the storing unit 14 and then executed. Thus, the system according to the present invention can be supplied to individual users through a network.

Figure 3:
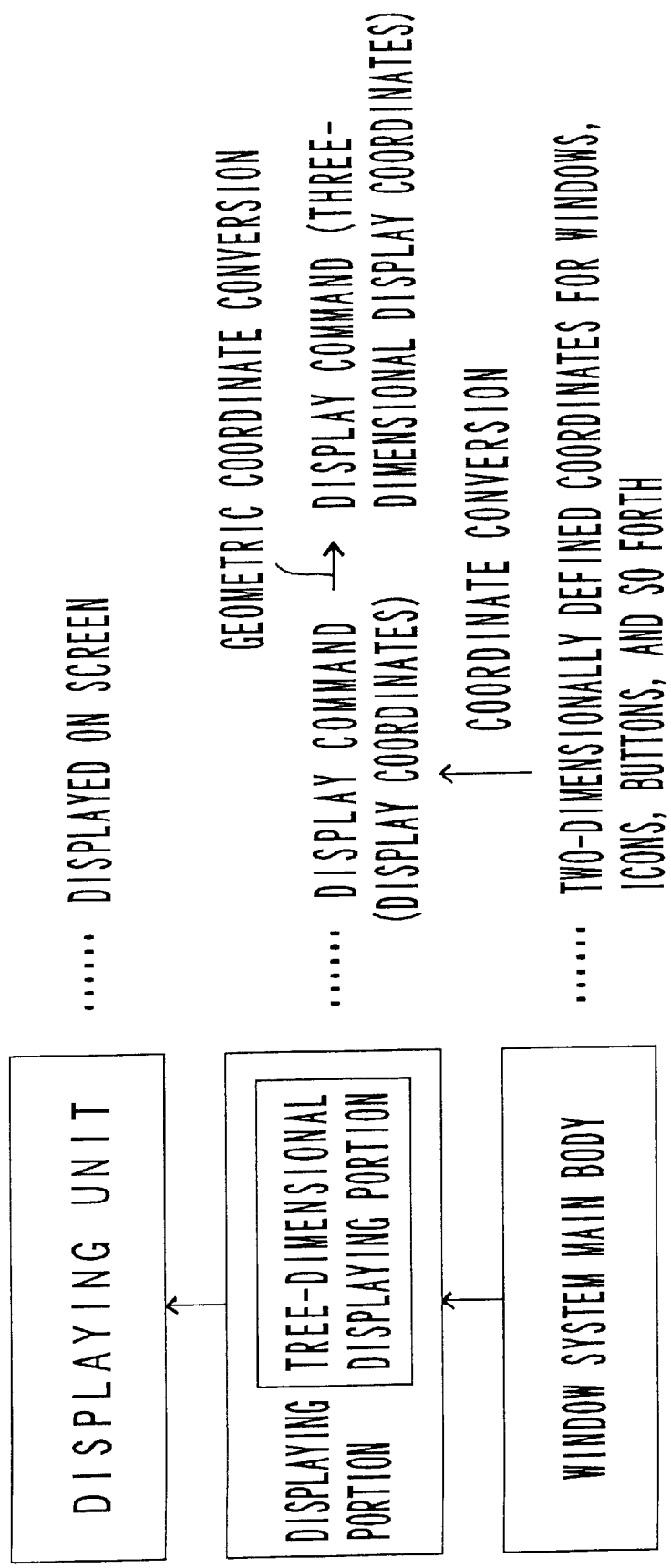
FIG. 3 is a schematic diagram showing the concept of the system according to the present invention.

FIG. 3 is a schematic diagram showing the concept of the system according to the present invention.

A window system (in particular, a window operating system) is composed of various objects. Windows displayed on the screen are composed as objects. Icons and buttons are also composed as objects and displayed on the screen. Patterns and so forth of such objects are defined on a two-dimensional plane termed a body coordinate system. Each object includes a display command for displaying the object on the screen. With the display command, a pattern defined in the body coordinate system is displayed in a display coordinate system of the screen.

A pattern defined in the body coordinate system is treated as a block. In the body coordinate system, for example, the center of gravity of a pattern is defined as the origin. Any position on the pattern in the body coordinate system is defined with relative coordinates to the center of gravity. When the coordinates of the center of gravity are designated, the coordinates of each point of the pattern are automatically converted and the pattern is displayed at a predetermined position on the screen.

According to the present invention, so as to three-dimensionally display windows, icons thereon, and so forth, before they are displayed on the screen of the display unit, patterns thereof defined in the body coordinate system are placed in the three-dimensional world coordinate system by a predetermined method. With a view point designated, the coordinates of the patterns are geometrically converted in such a manner that the patterns at the view point are projected to a screen plane defined in the world coordinate system. Thus, the windows and other objects placed in the world coordinate system are three-dimensionally displayed. Consequently, when the user changes the view point, he or she can observe a portion hidden behind another window.

To do that, the window system is composed of a window system main body and a displaying portion. The window system main body has definition data for various patterns and definition data for processes corresponding to individual buttons. The displaying portion has display commands for displaying the patterns on the screen. The displaying portion converts patterns of windows and so forth into the coordinates on the display unit so as to display them on the screen.

According to the present invention, the displaying portion has a three-dimensional display unit that converts two-dimensional coordinates into three-dimensional coordinates so as to three-dimensionally display windows and so forth.

As described above, since windows are three-dimensionally displayed by geometrically converting coordinate values supplied to the displaying portion of the window system, methods and so forth of objects defined in the window system main body are not changed. Thus, even if windows and icons are three-dimensionally displayed, the icons can be operated in the same manner as those of the conventional window system.

Figure 4:
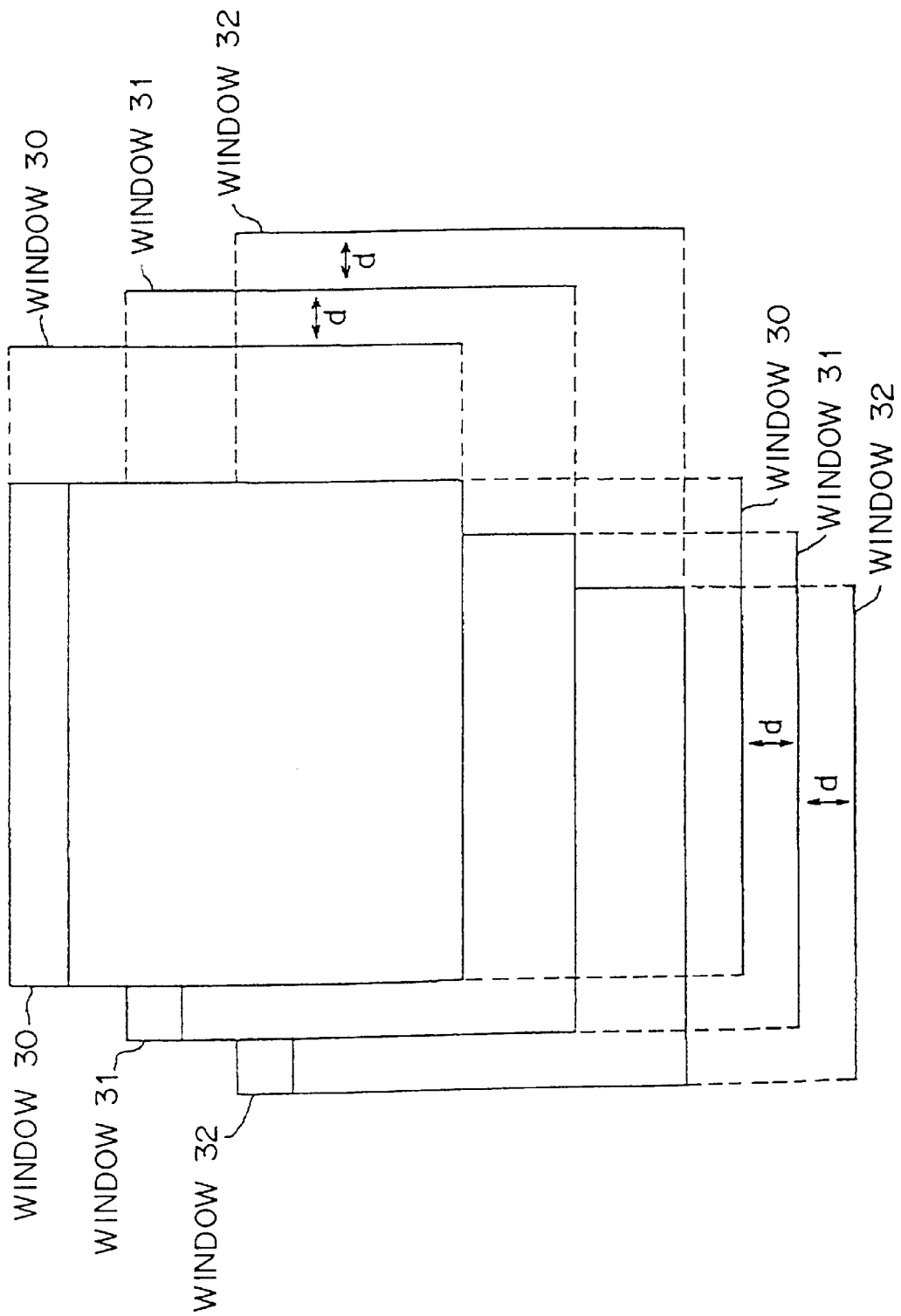
FIG. 4 is a schematic diagram showing an example of an arrangement of windows in a virtual three-dimensional space of the system according to the present invention.

FIG. 4 shows an example of an arrangement of windows in a virtual three-dimensional space according to the present invention.

As shown in FIG. 4, windows 30, 31, and 32 overlap with each other. Parts of the rear windows are hidden behind front windows. At this point, patterns of the windows 30, 31, and 32 are defined in the two-dimensional body coordinate system. According to the present invention, the patterns in the body coordinate system are not directly displayed on the screen, but temporarily re-defined in a virtual three-dimensional coordinate system. At this point, individual windows are defined at respective positions with a predetermined distance between each of them.

In other words, windows 30 and 31 are defined at respective positions that are a distance d apart in a virtual three-dimensional space. Likewise, windows 31 and 32 are defined at respective positions that are the distance d apart. To be concrete, the patterns of the windows 30, 31, and 32 are defined on respective xy planes that are the distance d apart in the z axis direction of the three-dimensional coordinate system.

When the windows 30, 31, and 32 are placed at the distance d apart from each other, by changing the position of the view point of the windows 30, 31, and 32, the user can observe part of the window 31 hidden behind the top window 30 or part of the window 32 hidden behind the window 31.

The user can freely set the position of the view point. For example, an indication that represents the position of the view point is displayed on the screen of the display unit. By a suitable operation, the user can change the position of the view point. Alternatively, when the user drags the mouse cursor in a predetermined direction, the position of the view point is moved in the dragged direction or the reverse direction thereof. Thus, the windows can be displayed from the view point position that the user has set. At this point, the position of the view point can be moved in various directions (such as left, right, up, down, and diagonal directions).

Likewise, icons displayed on windows are defined in a virtual three-dimensional space. At this point, the icons are defined at the same positions on the z axis as those of the windows. In other words, three-dimensional coordinates of icons displayed on the window 30 are defined so that the icons have the same z coordinate as the window 30. The z coordinate of the icons displayed on the window 31 are defined at a position the distance d apart along the z axis from the window 30. Likewise, the icons displayed on the window 32 are defined at positions the distance d apart along the z axis.

When patterns such as windows and icons defined in the body coordinate system are temporarily re-defined to a virtual three-dimensional coordinate system (world coordinate system), they can be displayed as three-dimensional windows.

Figure 5:
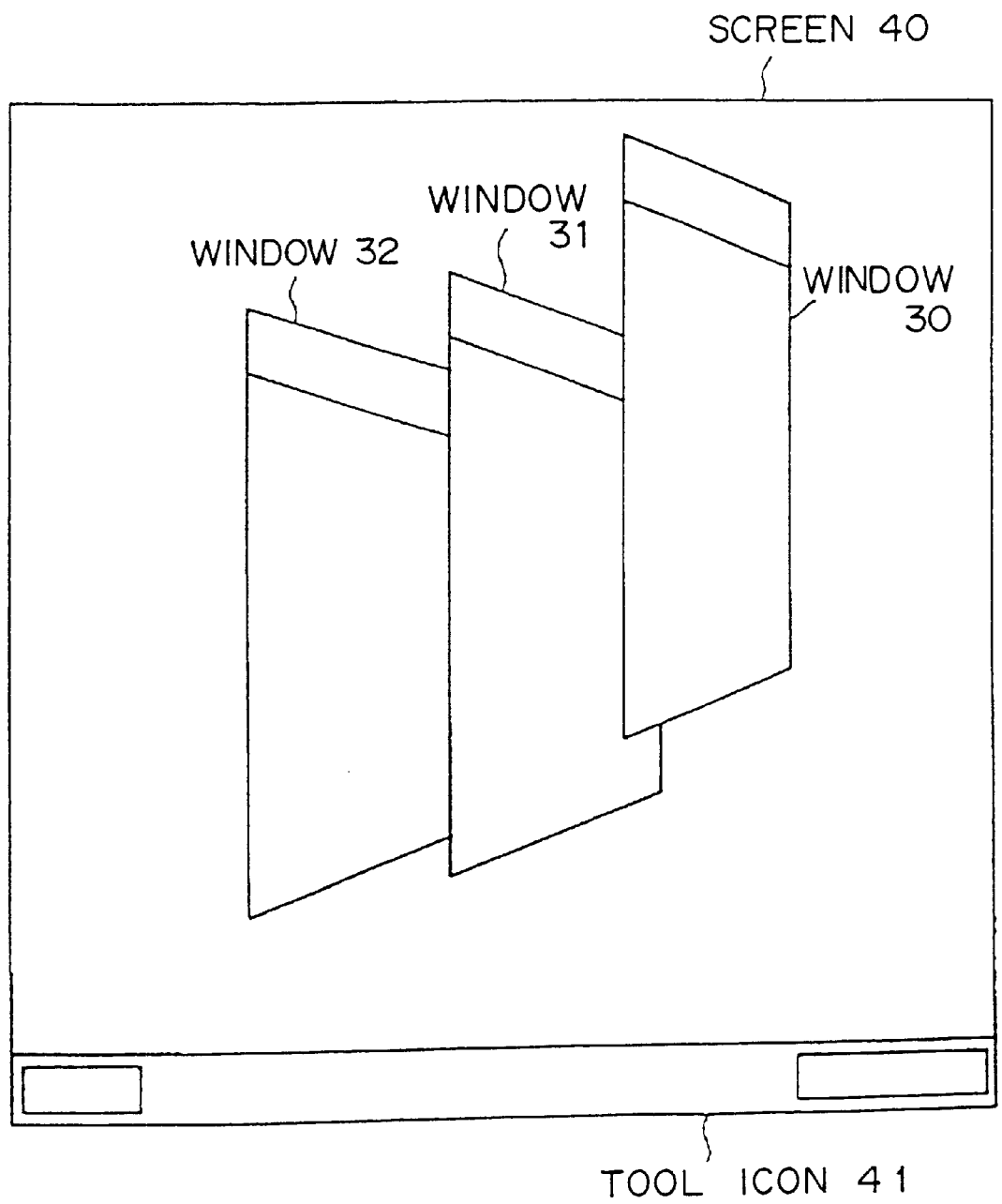
FIG. 5 is a schematic diagram showing an example of a screen that three-dimensionally displays windows in the case that the user can observe a portion hidden behind windows by changing his or her view point.

FIG. 5 shows an example of a screen that three-dimensionally displays windows of which the user can observe a portion hidden behind upper windows by changing the position of the view point.

In FIG. 5, a window 30 is placed at the top plane (closest to the view point). Windows 31 and 32 are placed on planes farther away than the window 30. The view point of the windows 30, 31, and 32 is designated at a left diagonal position thereof rather than the front position thereof.

A tool icon portion 41 is displayed at a lower portion of a screen 40. The tool icon portion 41 has buttons for controlling windows and so forth. Although the tool icon portion 41 composes the window system, since the tool icon portion 41 does not overlap with other objects, it is not necessary to three-dimensionally display the tool icon portion 41. Thus, the tool icon portion 41 is normally displayed, not re-defined in the virtual three-dimensional space (world coordinate system).

On the other hand, since the windows 30, 31, and 32 are opened on the screen 40 in sizes that the user can easily handle, they tend to overlap with each other. In addition, the user should operate icons displayed on the windows 30, 31, and 32. Thus, it is useful to decrease the overlapped portion of the windows 30, 31, and 32 and display all data on the windows 30, 31, and 32 at the same time. Consequently, with the system according to the present invention, the windows 30, 31, and 32 are three-dimensionally displayed.

According to the present invention, the position of the view point of the windows 30, 31, and 32 can be freely set. Thus, the windows 30, 31, and 32 can be observed from a right diagonal position of the screen, an upper position thereof, or a lower position thereof. However, since the windows can be moved on the plane of the screen, it is sufficient to designate only the left and right directions as necessary directions of the view point.

To display windows and icons thereon that the user observes in a diagonal direction, it is necessary to modify bit maps of the individual patterns. Thus, based on the position of the center of gravity of each pattern developed with a bit map, the relative position of the pattern should be calculated for each bit and converted in the world coordinate system.

FIG. 6 is a flowchart showing a process for moving a clicked window to the front of the screen as a top window.

When the user clicks a window, the system determines whether or not the clicked window is the top window (at step S1). When the determined result at step S1 is Yes, the flow advances to step S4. At step S4, the system re-draws the window and completes the process.

When the determined result at step S1 is No, the system substitutes (swaps) position information of the clicked window with that of the immediately upper window (at step S2). When the position information is substituted, the clicked window is placed on the upper plane. Next, the system determines whether or not the clicked window is the top window (at step S3).

When the determined result at step S3 is No, the flow returns to step S2. The system substitutes the position information of the clicked window with that of the immediately upper window. Thereafter, the system determines whether the clicked window is the top window. These steps are repeated until the clicked window becomes the top window. When the determined result at step S3 is Yes, the system re-draws the window and completes the process.

FIGS. 7A to 7C are schematic diagrams showing position information that is changed in the process shown in FIG. 6.

In FIG. 7A, the top window on the screen is referred to as window 1. Windows behind the window 1 are successively referred to as window 2, window 3, and so forth. Data that represents the positions of windows is defined in the world coordinate system. The data includes "depth" that represents the depth of a particular window to the top window. "Depth" is, for example, a z coordinate value in the world coordinate system.

The data that represents the position of a window is composed of an x coordinate value, a y coordinate value, width, and height. The x coordinate value and the y coordinate value of the data represent the position of the upper left corner of the window. The width of the data represents the length in the horizontal direction of the window. The height of the data represents the length in the vertical direction of the window.

When the position information of windows is substituted at step S2 of the process shown in FIG. 6, the x coordinate value, y coordinate value, width, and height of a window are substituted with those of another window in FIGS. 7A to 7C. However, the "depth" of the windows are not substituted.

Now, it is assumed that there is position information as shown in FIG. 7A and that a window 1 with data "x1, y1, w1, h1, depth1" is placed as the top window. When the user clicks a window 3 with data "x3, y3, w3, h3, depth3," the position information excluding "depth" of the window 3 is substituted with that of the window 2 that is the immediately upper window.

Thus, as shown in FIG. 7B, the position of the window 3 is substituted with the position of the window 2. In other words, the window 3 is placed at the position of "depth2," whereas the window 2 is placed at the position of "depth3." Thus, the window 3 is placed behind the window 1 and in front of the window 2.

Since the clicked window that is the window 3 has not been placed at the top of the screen, the window 3 is substituted with the window 1. In other words, the position information excluding "depth1" of the window 1 is substituted with the position information excluding "depth2" of the window 3. Thus, as shown in FIG. 7C, the window 3 is placed at the top of the screen. In other words, the window 3 has "depth1" that represents the depth of the window 1 that was placed at the top of the screen. Thus, the windows 1 and 2 are placed behind the window 3.

FIGS. 8A to 10B are schematic diagrams for explaining a method for three-dimensionally displaying windows.

Figures 8A, 8B:
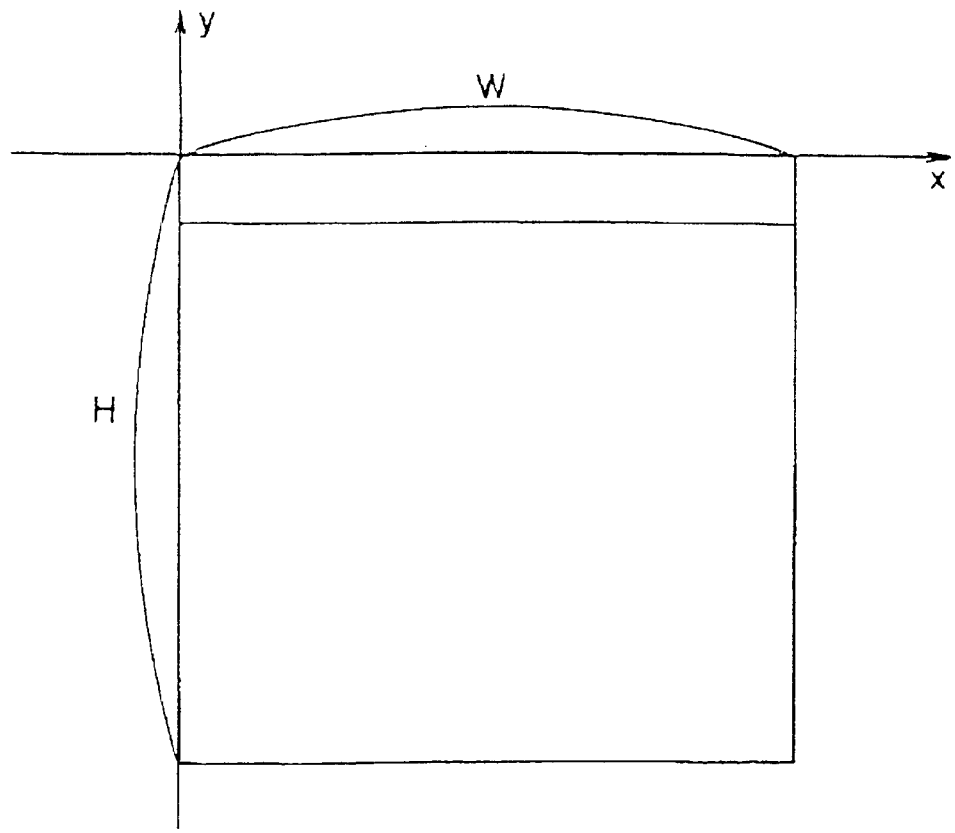
FIGS. 8A and 8B are schematic diagrams showing definition and data structure of a window in body coordinate system.

FIGS. 8A and 8B are schematic diagrams showing a definition of a window in the body coordinate system and a data structure thereof, respectively.

FIG. 8A is a schematic diagram showing a method for defining a window in the body coordinate system. In FIG.

8A, based on the upper left corner of the window as the origin, the width W and the height H thereof are defined as a basic scale. In addition, characters and buttons displayed on the window are defined. Although characters and buttons are defined as objects, for simplicity, only parameters that define the outer shape of the window will be described.

Thus, a window can be defined with the width W and the height H thereof in the body coordinate system.

FIG. 8B is a schematic diagram showing a normal data structure of a window.

As data of a window, FIG. 8B shows the x coordinate value at the upper left corner thereof, the y coordinate value at the upper left corner thereof, the width W thereof, the height H thereof, and the depth thereof. The x coordinate value, the y coordinate value, and the depth are values defined in the world coordinate system that will be described later. The width W and the height H are defined in the above-described body coordinate system. In addition, the data includes buttons displayed on windows and pointers of fixed objects (such as characters) that are not moved from one window to another window.

Figure 9:
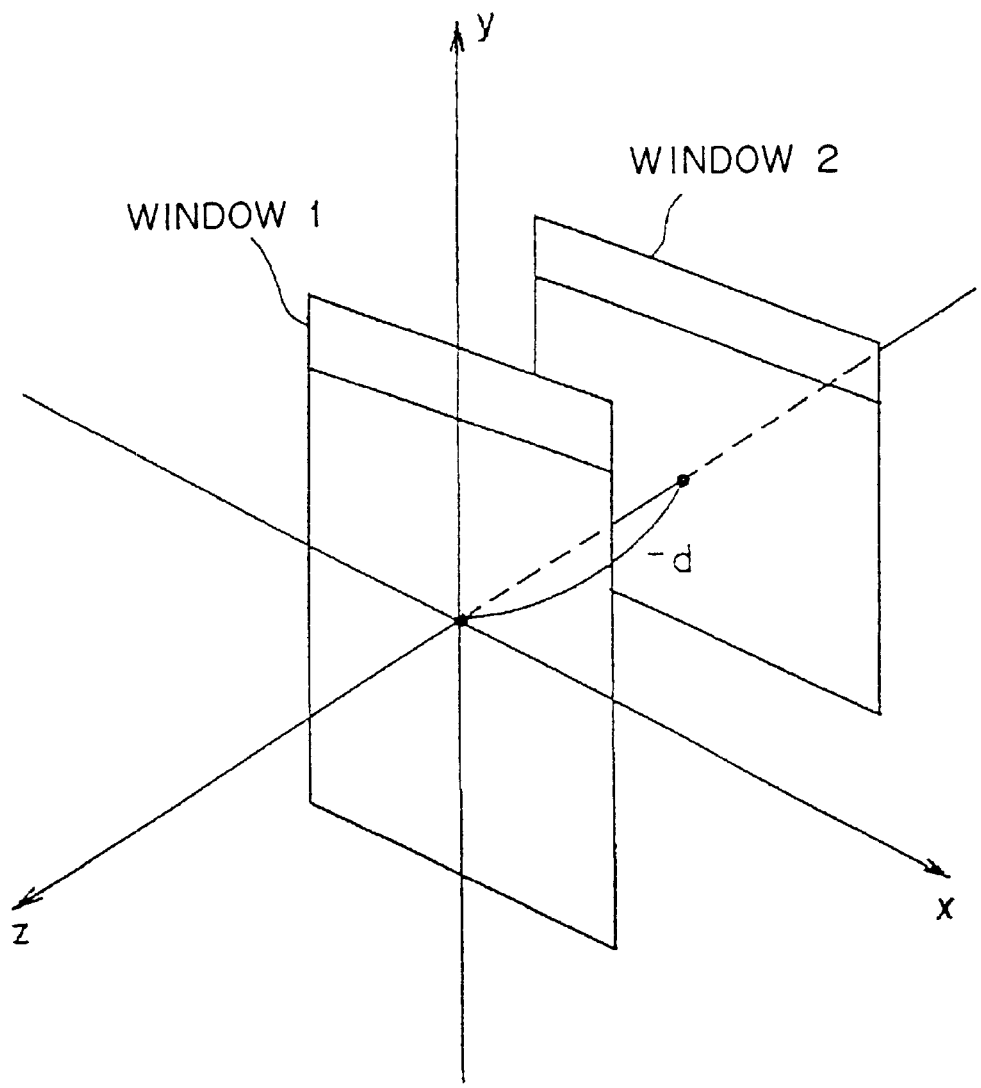
FIG. 9 is a schematic diagram showing an example of an arrangement of windows in world coordinate system.

FIG. 9 is a schematic diagram showing an example of an arrangement of windows in the world coordinate system.

The world coordinate system is a virtual three-dimensional space in which windows and other objects are temporarily arranged to display them three-dimensionally. For example, in FIG. 9, a window 1 is placed on the xy plane whose z coordinate value is 0. A window 2 is placed behind the window 1. The window 2 is placed on the xy plane whose z coordinate value is −d. It should be noted that the windows 1 and 2 may be placed in any arrangement other than the example shown in FIG. 9. However, for simplicity, the windows 1 and 2 are arranged as shown in FIG. 9.

In other words, when a window is placed in the world coordinate system, the coordinates of the upper left corner of the window are designated. When the coordinates of the upper left corner are (x1, y1), coordinates of points necessary for a pattern of the window are designated. In this case, objects and so forth displayed on the window are ignored and only the outer shape of the window are considered. Thus, only coordinates of four corners of the window are required. They can be obtained from the coordinates at the upper left corner of the window and the width W and the height H defined in the body coordinate system. In other words, the coordinates of the four corners of the window are expressed as follows.

(x1, y1)

(x1+W, y1)

(x1, y1+H)

(x1+W, y1+H)

Thus, the positions on the xy plane of the window are obtained. Next, the z coordinate value corresponding to the depth of the window is designated. The depth of the window is defined in the range of z≦0. As the negative value of the z coordinate increases, the window is placed on a lower plane. Thus, the top window is placed on the plane of which z=0. In addition, the z coordinate of the view point is defined in the range of z>0.

In FIG. 9, the depth z of the window 1 is 0. The depth z of the window 2 is −d. It is preferred that windows are arranged a predetermined distance apart from each other in the negative direction of the z coordinate. In this case, the z coordinate of a window i is expressed as z=−(i−1)×d. Thus, the coordinates of the four corners of the window rearranged in the world coordinate system are expressed as follows.

$$\left.\begin{array}{l}(x1, y1, -(i-1)d)\\(x1+W, y1, -(i-1)d)\\(x1, y1+H, -(i-1)d)\\(x1+W, y1+H, -(i-1)d)\end{array}\right\} \quad (1)$$

Next, the position of the view point in the world coordinate system is designated. As described above, although the position of the view point is limited in the range of z>0, it is defined as (e1, e2, e3). In addition, a vector having the coordinate components described above is referred to as a view point vector and defined as follows.

$$\vec{e} = (e1, e2, e3)$$

Figure 10A:
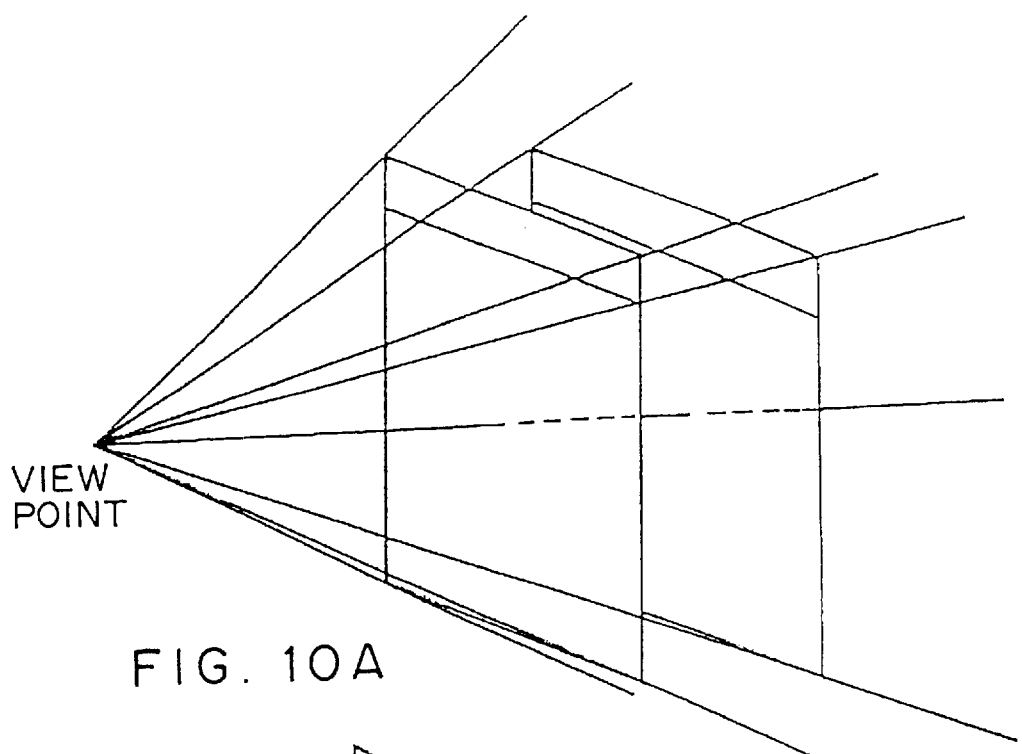
FIGS. 10A and 10B are schematic diagrams for explaining a method for obtaining projected images of windows on a screen in the case that the user observes the windows from a particular view point.
Figure 10B:
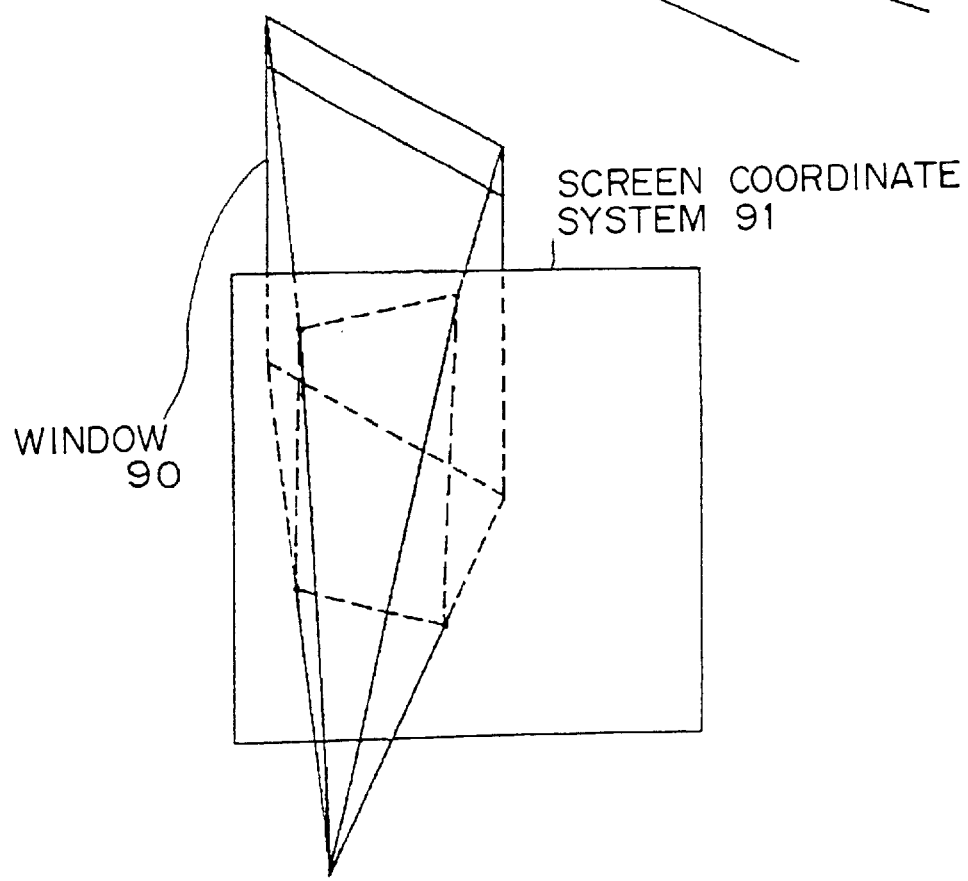

FIGS. 10A and 10B are schematic diagrams for explaining a method for obtaining a projected image on a screen in the case that the user observes a window from a view point.

As shown in FIG. 10A, straight lines that emanate from a view point and points that represent the position of four corners of a window are obtained. Now, it is assumed that in the world coordinate system a vector that extends to the points representing the position of the four corners of the window is denoted as follows.

$$\vec{W}$$

This vector is used to represent all points necessary for designating the pattern and the position of an object placed in the world coordinate system. When a window is represented with the outer shape thereof, the vector represents the coordinates of the four corners thereof. In other words, the vector has elements expressed by the formula (1).

When a vector that emanates from the origin to points on straight lines that connect the view point and the four corners of the window is denoted as follows, in the world coordinate system, $\vec{Z}$, the straight lines that connect the view point and the four corners of the window, are expressed as follows.

$$\vec{Z} = \lambda(\vec{W} - \vec{e}) + \vec{e} \quad (2)$$

where λ is any real number.

Next, as shown in FIG. 10B, a plane on which the screen coordinate system is placed is defined. The plane can be placed at any position in the world coordinate system. However, for simplicity, this plane is defined as a plane that intersects with the origin in the world coordinate system. In addition, since an object such as a window is projected on the plane, it is perpendicular to the view point vector. Consequently, the plane of the screen in the world coordinate system is expressed as follows.

$$\vec{X} \cdot \vec{e} = 0 \quad (3)$$

where a vector that connect points on the screen and the origin in the world coordinate system is denoted as follows.

$$\vec{X}$$

By obtaining points of intersection between straight lines expressed by the formula (2) and the plane expressed by the formula (3), points of the window projected on the screen are expressed as follows.

$$\{\lambda(\vec{W} - \vec{e}) + \vec{e}\} \cdot \vec{e} = 0 \quad (4)$$

$$\therefore \lambda = \frac{-e^2}{(\vec{W} - \vec{e}) \cdot \vec{e}}$$

$$\vec{Z}' = \frac{-e^2(\vec{W} - \vec{e})}{(\vec{W} - \vec{e}) \cdot \vec{e}} + \vec{e} = \frac{(\vec{W} \cdot \vec{e})\vec{e} - e^2\vec{W}}{(\vec{W} - \vec{e}) \cdot \vec{e}}$$

$$e^2 \equiv \vec{e} \cdot \vec{e}$$

where $\vec{Z}'$ represents a vector that extends to the points of intersection between straight lines that connect the view point and the four corners of the window and the plane of the screen.

Next, base vectors of which a coordinate system is defined on the screen plane expressed by the formula (3) are designated. The base vectors are denoted as follows.

$$\vec{a}, \vec{b}$$

The base vectors are defined as follows.

$$\vec{e} \cdot \vec{a} = 0$$

$$\vec{e} \cdot \vec{b} = 0$$

$$\vec{a} \cdot \vec{b} = 0$$

$$\vec{a} = (a_1, 0, a_3)$$

$$\vec{a}^2 = \vec{b}^2 = 1$$

Thus, points expressed by the formula (4) in the coordinate system on the screen defined by the following $\vec{a}, \vec{b}$ are presented by the following formula.

$$\left( \frac{(\vec{W} \cdot \vec{e})\vec{e} - e^2\vec{W}}{(\vec{W} - \vec{e}) \cdot \vec{e}} \cdot \vec{a}, \frac{(\vec{W} \cdot \vec{e})\vec{e} - e^2\vec{W}}{(\vec{W} - \vec{e}) \cdot \vec{e}} \cdot \vec{b} \right) = \quad (5)$$

$$\left( -\frac{\vec{W} \cdot \vec{a}}{\frac{\vec{W} \cdot \vec{e}'}{e} - 1}, -\frac{\vec{W} \cdot \vec{b}}{\frac{\vec{W} \cdot \vec{e}'}{e} - 1} \right)$$

$$\vec{e}' \equiv \frac{\vec{e}}{e}, e \equiv |\vec{e}|$$

With the world coordinate positions of an object such as a window in the formula (5), $\vec{W}$, the coordinate values in the screen coordinate system, are obtained.

By properly converting coordinates of the obtained coordinate values, the window is three-dimensionally displayed on the display unit. In this case, since the origin of the screen of the display unit is designated at the upper left corner, the x coordinate value increasing in the right direction, the y coordinate value increasing in the downward direction, the coordinate values are converted.

Thus, as shown in FIG. 10B, a window 90 that the user observes from a diagonal view point can be projected on a screen coordinate system 91.

Figure 11A:
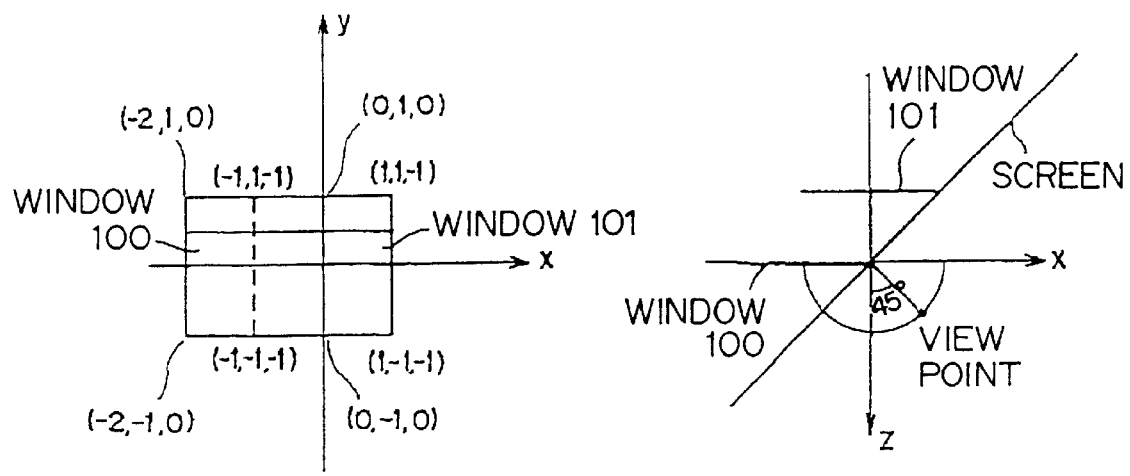
FIGS. 11A and 11B are schematic diagrams for explaining a real example of the method described with reference to FIGS. 8A to 10B.
Figure 11B:
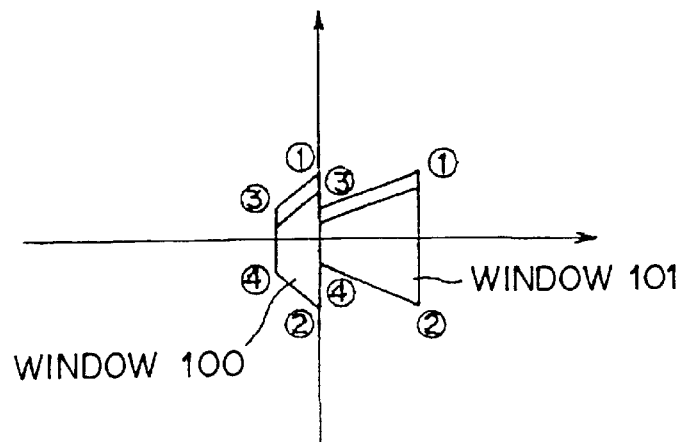

FIGS. 11A and 11B are schematic diagrams for explaining a concrete application of the method described with reference to FIGS. 8A to 10B.

FIG. 11A is a schematic diagram showing an arrangement of windows in the world coordinate system. FIG. 11A shows two windows 100 and 101 whose sizes are the same and they overlap with each other by half. The window 100 is placed in front of the window 101. It is assumed that the view point is placed on the xz plane, that a base vector a is placed in parallel with the xz plane, and that a base vector $\vec{b}$ is placed on the y axis. In addition, it is assumed that the view point vector, the base vectors in the screen coordinate system, and points of the four corners of the windows 100 and 101 are expressed as follows.

$$\vec{e} = (\sin\theta, 0, \cos\theta)$$

$$\vec{a} = (\cos\theta, 0, -\sin\theta)$$

$$\vec{b} = (0, 1, 0)$$

$$\text{Window } 101 \; \vec{W} \to \left\{ \begin{array}{l} (1)(1, 1, -1), (2)(1, -1, -1) \\ (3)(-1, 1, -1), (4)(-1, -1, -1) \end{array} \right\}$$

$$\text{Window } 100 \; \vec{w} \to \left\{ \begin{array}{l} (1)(0, 1, 0), (2)(0, -1, 0) \\ (3)(-2, 1, 0), (4)(-2, -1, 0) \end{array} \right\}$$

When the vector of each point defined as described above is substituted into the formula (5), the coordinate values of the windows 101 and 100 are expressed as follows.

$$\text{Window } 101 \left\{ \begin{array}{l} (1) \dfrac{1}{\sin\theta - \cos\theta - 1}(-(\cos\theta + \sin\theta), -1) \\ (2) \dfrac{1}{\sin\theta - \cos\theta - 1}(-(\cos\theta + \sin\theta), 1) \\ (3) \dfrac{-1}{\sin\theta + \cos\theta + 1}(\cos\theta - \sin\theta, -1) \\ (4) \dfrac{-1}{\sin\theta + \sin\theta + 1}(\cos\theta - \sin\theta, 1) \end{array} \right.$$

$$\text{Window } 100 \left\{ \begin{array}{l} (1)(0, 1) \\ (2)(0, -1) \\ (3) \dfrac{1}{2\sin\theta + 1}(-2\cos\theta, 1) \\ (4) \dfrac{1}{2\sin\theta + 1}(-2\cos\theta, -1) \end{array} \right.$$

Assuming that the view point of the windows 100 and 101 is at 45° (θ=45°) in the right diagonal direction, the coordinates thereof are calculated and plotted as shown in FIG. 11B.

In FIG. 11B, the windows 100 and 101 are displayed in perspective. In addition, the windows 100 and 101 do not overlap with each other. Thus, the user can observe the full contents of the window 101 placed behind the window 100.

In the above-described example, the length of the view point vector is 1 and the distance between the windows 100 and 101 is 1. However, the length of the view point vector and the distance between the windows should be designated by the designer of the apparatus of the present invention so that the user can easily observe the windows. Thus, the length of the view point vector and the distance between the windows are not limited to the values given in the above-described embodiment.

In the above description, the coordinates of the four corners of each window are converted. In reality, however, when required points that define patterns of icons on windows are converted in the same manner, windows and other objects such as icons and buttons thereon can be three-dimensionally displayed. Thus, it should be noted that the above-described embodiment is not limited to only the points of the four corners of each window.

Figure 12:
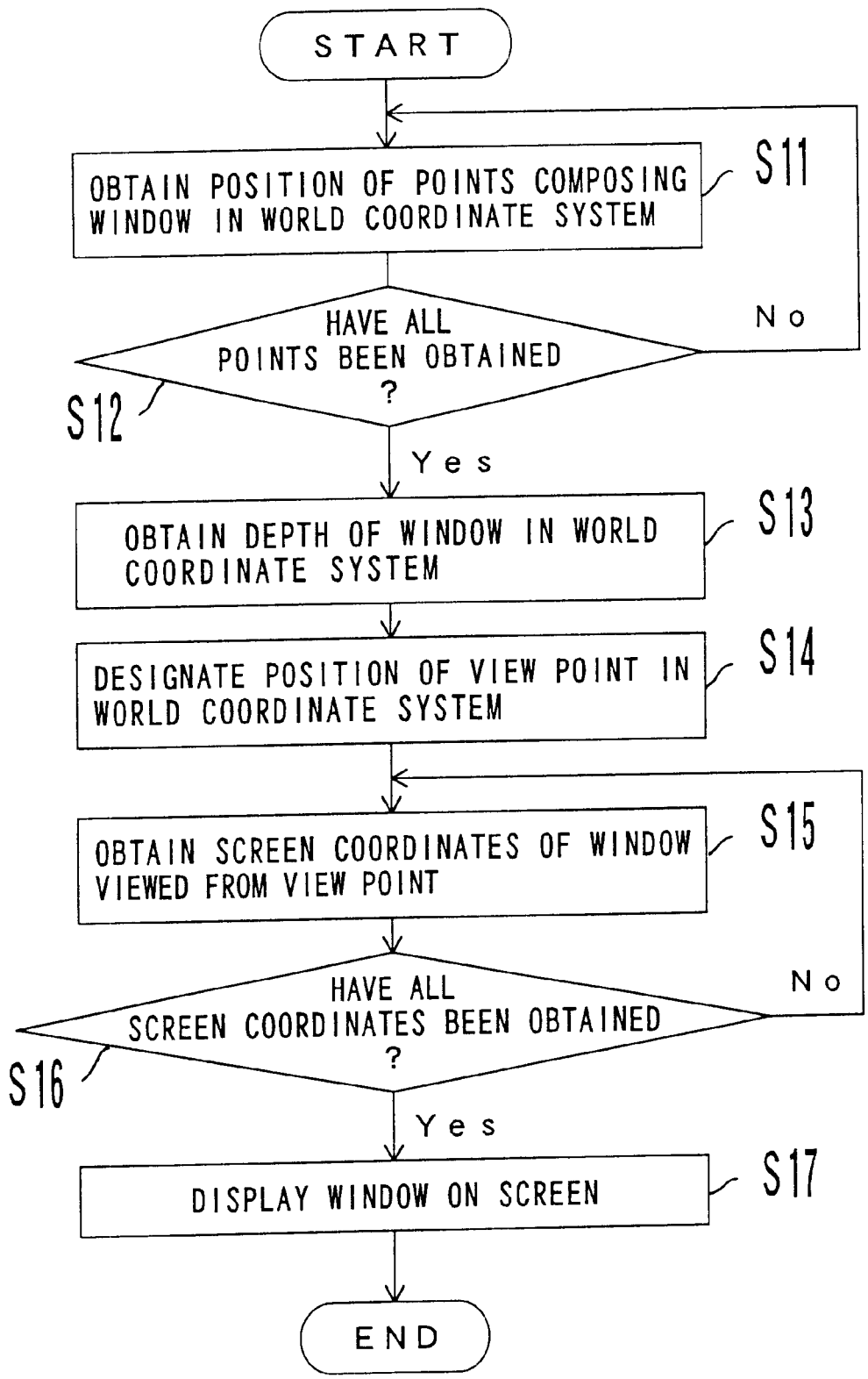
FIG. 12 is a flowchart showing a process for three-dimensionally displaying windows described with reference to FIGS. 8A to 10B.

FIG. 12 is a flowchart showing a process for three-dimensionally displaying windows described with reference to FIGS. 8A to 10B.

At step S11, the apparatus obtains coordinate values of individual points that define a window from definition data (see FIG. 8B) of the window and places the individual points that compose the window in the world coordinate system. In other words, the apparatus obtains the x coordinate value and the y coordinate value at the upper left corner of the window and converts them into coordinate values in the world coordinate system. This process corresponds to the process for placing the upper left corner of the window on the xy plane (in FIG. 9).

At step S12, the apparatus determines whether or not the process at step S11 has been performed for all the points that compose the window. In this case, since only the point of the upper left corner of the window has been placed in the world coordinate system, the flow returns to step S11. At step S11, the system places another point of the window in the world coordinate system. In other words, with the width and height of the window shown in FIG. 8B, the system places the coordinates of the points of the four corners of the window in the world coordinate system. In the above-described example, since the shape and position of a window is defined with points of four corners thereof, after the process at step S11 is completed, the determined result at step S12 becomes Yes. Thus, the flow advances to step S13.

At step S13, the apparatus obtains the depth of the window shown in FIG. 8B. The apparatus designates the position in the z axis direction shown in FIG. 8 to the window placed in the world coordinate system at step S11. Thus, the window has been completely defined in the world coordinate system including the depth direction. Thus, the coordinate values of the points of the four corners are equivalent to real numeric values obtained by substituting concrete values into the formula (1).

At step S14, the apparatus designates coordinate values at the position of the view point of the window in the world coordinate system. This process corresponds to the process for designating the coordinates of the view point to (e1, e2, e3) (namely, the user inputs real three-dimensional coordinate values from the inputting/outputting unit). Since it is difficult for the user to input the view point coordinates from the inputting unit, an interface such as a mouse is used. For example, a semi-sphere is displayed. When the mouse is dragged on the semi-sphere, the view angle of the window is designated. The distance between the window and the view point is adjusted by dragging a small window that represents the relative position between the window and the view point.

Thus, since the coordinate values of all the points that compose the window in the world coordinate system and the coordinate values of the view point have been designated, the apparatus designates a screen plane in the world coordinate system and obtains the screen coordinates (at step S15). In this case, although the screen plane can be freely designated, it is preferred to define a line that connects the view point coordinates and the center of the window as a view line and define a plane perpendicular to the view line as the screen plane. In addition, the distance from the view point on the screen plane can be freely designated. For example, in the above-described example, the screen plane is a plane that intersects with the origin in the world coordinate system regardless of the distance from the view point. Such flexibility should be designated by the designer of the apparatus.

As shown in FIGS. 10A and 10B, the process for obtaining the screen coordinates at step S15 is performed by connecting the view point and individual points that compose the window and by representing points at which the screen plane intersects with these lines in the coordinate system on the screen plane. Such a process corresponds to the process for substituting real values into the formula (5) in the above-described example.

At step S16, the apparatus determines whether or not the coordinates of all the points have been converted from the world coordinate system to the screen coordinate system. When the determined result at step S16 is No, the flow returns to step S15. At step S15, the apparatus obtains the screen coordinate values. In this example, when the system has converted the coordinates of all the points of the four corners of the window from the world coordinate system to the screen coordinate system, the determined result at step S16 becomes Yes.

When the determined result at step S16 is Yes, the apparatus displays the window with the obtained screen coordinates on the screen of the display unit (at step S17).

It should be noted that the flowchart shown in FIG. 12 is an example for the coordinate converting process. Thus, the present invention is not limited to the process of this flowchart.

According to the present invention, even if a plurality of windows overlap with each other, the overlapped portion can be easily handled. Thus, an image of a window hidden behind another window can be displayed and, for example, a file can be easily copied or moved between windows that overlap with each other.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A window display apparatus for displaying a plurality of windows of a window operating system on a display unit, at least part of the windows overlapping, comprising:

a virtual distance defining unit defining virtual distances in a depth direction to the windows wherein each window is substantially parallel;

a window rearranging unit rearranging an order of the windows so that a window which is selected is placed as a top window, so that depth position information of the selected window is changed with depth position information of a current top window; and an image generating unit generating images of the windows whose virtual distances have been defined by said virtual distance defining unit, the images being viewed from a view point freely designated, from a depth direction diagonal to said depth direction, wherein the images generated by said image generating unit are displayed on the display unit and transformed as a whole according to movement of the view point.

2. A window displaying apparatus for displaying a plurality of windows on a display unit at least part of the windows overlapping, comprising:

a virtual distance defining unit defining virtual distances in a depth direction to the windows, wherein each window is substantially parallel;

a window rearranging unit rearranging an order of the windows so that a window which is selected is placed as a top window, so that depth position information of the selected window is changed with depth position information of a current top window; and a unit generating images of the windows whose virtual distances have been defined by said virtual distance defining unit, the images being viewed from a view point freely designated, from a direction diagonal to said depth direction and displaying an overlapped portion of the windows on the display unit.

3. A window displaying apparatus for displaying a plurality of windows on a display unit and displaying an object on the windows, the object being operated under an environment, at least part of the windows overlapping, comprising:

a virtual distance defining unit defining virtual distances in a depth direction to the windows wherein each window is substantially parallel;

a window rearranging unit rearranging an order of the windows so that a window which is selected is placed as a top window, so that depth position information of the selected window is changed with depth position information of a current top window; and a generating unit generating images of the windows whose virtual distances have been defined by said virtual distance defining unit, the images being viewed from a view point freely designated from a direction diagonal to said depth direction, and an image of the object, wherein the images generated by said image generating unit are displayed on the display unit and transformed as a whole according to the view point.

4. A window displaying apparatus for displaying a plurality of windows on a display unit and displaying an object on the windows, the object being operated under an environment, at least part of the windows overlapping, comprising:

virtual distance defining unit defining virtual distances in a depth direction to the windows wherein each window is substantially parallel;

a window rearranging unit rearranging an order of the windows so that a window which is selected is placed as a top window, so that depth position information of the selected window is changed with depth position information of a current top window; and a generating unit generates images of the windows whose virtual distances have been defined, the images being viewed from the view point freely designated from a direction diagonal to said depth direction, and an image of the object and displaying an overlapped portion of the windows and the object at the overlapped portion on the display unit.

5. The window displaying apparatus as set forth in claim 3, wherein the object corresponds to a predetermined process, and when the object is operated, the predetermined process performed.

6. A window displaying method for displaying a plurality of windows on a display unit, at least part of the windows overlapping, comprising:

defining virtual distances in a depth direction to the windows wherein each window is substantially parallel;

rearranging an order of the windows so that window which is selected is placed as a top window, so that depth position information of the selected window is changed with depth' position information of a current top window; and generating images of the windows whose virtual distances have been defined at the virtual distance defining step, the images being viewed from a view point freely designated, from a direction diagonal to said depth direction wherein the images generated by said generating are displayed on the display unit and transformed as whole according to movement of the view point.

7. A window displaying method for displaying a plurality of windows on a display unit, at least part of the windows overlapping, comprising:

defining virtual distances in a depth direction to the windows wherein each window is substantially parallel;

rearranging an order of the windows so that a window which is selected is placed as a top window, so that depth position information of the selected window is changed with depth position information of a current top window; and generating images of the windows whose virtual distances have been defined at the virtual distance defining step, the images being viewed from a view point freely designated from a direction diagonal to said depth direction, and displaying an overlapped portion of the windows on the display unit wherein the images generated by said generating are displayed on the display unit and transformed as a whole according to movement of the view point.

8. A method for displaying a plurality of windows on a display unit and displaying an object on the windows, the object being operated under an environment, at least part of the windows overlapping with each other, comprising:

defining virtual distances in a depth direction to the windows wherein each window is substantially parallel;

rearranging an order of the windows so that a window which is selected is placed as a top window, so that depth position information of the selected window is changed with depth position information of a current top window; and generating images of the windows whose virtual distances have been defined at the virtual distance defining step, the images being viewed from a view point freely designated from a direction diagonal to said depth direction, the images being transformed as a whole according to movement of the viewpoint, and an image of the object.

9. A method for displaying a plurality of windows on a display unit and displaying an object on the windows, the object being operated under an environment provided by the window operating system, at least part of the windows overlapping, comprising:

defining virtual distances in a depth direction to the windows wherein each window is substantially parallel;

rearranging an order of the windows so that a window which is selected is placed as a top window, so that depth position information of the selected window is changed with depth position information of a current top window; and generating images of the windows whose virtual distances have been defined at the virtual distance defining step, the images being viewed from a view point freely designated from a direction diagonal to said depth direction, the images being transformed as a whole according to movement of the view point, and an image of the object, and displaying an overlapped portion of the windows and the object at the overlapped portion of the display unit.

10. A storage medium from which a computer that displays a plurality of windows on a display unit, at least part of the windows overlapping, reads data that causes the computer to perform:

defining virtual distances in a depth direction wherein each window is substantially parallel; rearranging an order of the windows so that a window which is selected is a top window, so that depth position information of the selected window is changed with depth position information of a current top window; and generating images of the windows whose virtual distances have been defined by the virtual distance defining function, the images being viewed from a view point freely designated from a direction diagonal to said depth directions wherein the images generated by said generating are displayed on the display unit and transformed as a whole according to movement of the view point.

11. A storage medium from which a computer that displays a plurality of windows on a display unit, at least part of the windows overlapping, reads data that causes the computer to perform:

defining virtual distances in a depth direction to the windows wherein each window is substantially parallel;

rearranging an order of the windows so that a window which is selected is a top window, so that depth position information of the selected window is changed with depth position information of a current top window; and generating images of the windows whose virtual distances have been defined by the virtual distance defining function, the images being viewed from a view point freely designated from a direction diagonal to said depth direction, and displaying an overlapped portion of the windows on the display units wherein the images generated by image generating are displayed on the display unit and transformed as a whole according to movement of the view point.

12. A controller for enabling the display of a plurality of windows on a display unit, at least part of the windows overlapping, comprising:

a virtual distance defining unit defining virtual distances in a depth direction to the windows wherein each window is substantially parallel;

a window rearranging unit rearranging an order of the windows so that a window which is selected is placed as a top window, so that depth position information of the selected window is changed with depth position information of a current top window; and a unit generating images of the windows whose virtual distances have been defined by said virtual distance defining unit, the images being viewed from a view point freely designated from a direction diagonal to said depth direction, and the images generated by said image generating unit are displayed on the display unit and transformed as a whole according to movement of the view point.

13. The controller claimed in said claim 12, wherein said controller further controls displaying an object on the windows on the display device.

14. A controller for enabling the display of a plurality of windows on a display unit, at least part of the windows overlapping, comprising:

a virtual distance defining unit defining virtual distances in a depth direction to the windows wherein each window is substantially parallel;

a window rearranging unit rearranging an order of the windows so that a window which is selected is placed as a top window, so that depth position information of the selected window is changed with depth position information of a current top window; and an image generating unit generating images of the windows whose virtual distances have been defined by said virtual distance defining unit, the images being viewed from a view point freely designated from a direction diagonal to said depth direction, the images generated by said image generating unit are displayed on the display unit and transformed as a whole according to movement of the view point, and controlling display of an overlapped portion of the windows on the display unit.

15. The controller claimed in claim 14, wherein said controller further controls to display an object on the windows on the display device.

* * * * *